United States Patent
Weeks

[11] Patent Number: 5,536,393
[45] Date of Patent: Jul. 16, 1996

[54] COFFEE FILTER RETAINING INSERT

[76] Inventor: Rebecca C. Weeks, 2071 Radcliff Rd., Saraland, Ala. 36571

[21] Appl. No.: 517,742

[22] Filed: Aug. 22, 1995

[51] Int. Cl.$^6$ .................................................. B01D 29/085
[52] U.S. Cl. ........................... 210/86; 210/232; 210/477; 210/482; 99/295; 99/305
[58] Field of Search ........................... 99/295, 305, 306; 426/77; 210/86, 473, 474, 479, 482, 232

[56] References Cited

U.S. PATENT DOCUMENTS

| | | | |
|---|---|---|---|
| 638,698 | 12/1899 | Bourie | 210/473 |
| 1,516,881 | 11/1924 | Collins | 210/86 |
| 2,365,269 | 12/1944 | Hill | 99/305 |
| 2,496,757 | 2/1950 | Sieling | 210/474 |
| 2,649,966 | 8/1953 | Johnston | 210/86 |
| 2,684,624 | 7/1954 | Alvarez | 210/482 |
| 3,081,693 | 3/1963 | Day | 210/474 |
| 4,728,425 | 3/1988 | Sandvig | 210/477 |
| 4,963,262 | 10/1990 | Johnstone | 210/474 |
| 5,064,533 | 11/1991 | Anson | 210/232 |
| 5,211,104 | 5/1993 | Arpin | 99/295 |
| 5,252,211 | 10/1993 | Searfoss, Jr. | 210/474 |
| 5,290,444 | 3/1994 | Campbell | 210/473 |

Primary Examiner—W. L. Walker
Attorney, Agent, or Firm—Joseph N. Breaux

[57] ABSTRACT

A coffee filter retaining insert including a retaining body having a first section that is slidably positionable with respect to a second section thereof to provide a variable diameter enclosure area, at least four resilient standoff arms having a first end secured to the exterior of the retaining body, a plurality of spaced, parallel oriented, coffee ground level indicators disposed along the interior wall of the retaining body, and an indicator assembly secured to the interior wall adjacent the spaced level indicators having a marking bead positionable along a rod member running perpendicular to the orientation of the level indicators.

20 Claims, 4 Drawing Sheets

COFFEE FILTER RETAINING INSERT

TECHNICAL FIELD

The present invention relates to devices for maintaining a disposable coffee filter in a proper position within a coffee brewing vessel and more particularly to devices inserted within the disposable coffee filter that bias the coffee filter against the interior sidewall of the brewing vessel with at least four resilient biasing members.

BACKGROUND ART

Drip-type coffee makers often require the use of disposable paper filters that are placed within the brewing vessel of the coffee maker and that contain the coffee grounds used to brew the coffee. The disposable filter generally has corrugated shaped sides to help maintain the sidewall of the filter in an upright position while the brewing takes place. If the sidewalls collapse, coffee grounds can escape from the filter and contaminate the coffee. It would be a benefit, therefore, to have a coffee filter retaining insert that may be placed within the coffee filter after it has been inserted within the brewing vessel. It would be a further benefit if the retaining insert had a mechanism that contacted the sidewall of the filter and urged it against the sidewall of the brewing vessel.

Another problem with brewing coffee is the depositing of the correct quantity of coffee within the filter. Although the number of scoops of coffee may provide an indication of the quantity of coffee required by a particular coffee maker to make a perfect pot of coffee, the level to which the scoop is filled is often a subjective call that can lead to too strong or weak coffee. It would be a benefit, therefore, to have a coffee level indicator, positionable by a user, that indicates the level to which the filter should be filled to produce a perfect pot of coffee.

GENERAL SUMMARY DISCUSSION OF INVENTION

It is thus an object of the invention to provide a coffee filter retaining insert that may be placed within the coffee filter after the coffee filter has been inserted into the brewing vessel that will support the sidewalls of the filter and assist in preventing the sidewall of the filter from collapsing during the coffee brewing process.

It is a further object of the invention to provide a coffee filter retaining insert that may be placed within the coffee filter after the coffee filter has been inserted into the brewing vessel.

It is a further object of the invention to provide a coffee filter retaining insert that may be placed within the coffee filter after the coffee filter has been inserted into the brewing vessel that includes a mechanism that contacts the sidewall of the filter and urges it against the sidewall of the brewing vessel.

It is a further object of the invention to provide a coffee filter retaining insert that may be placed within the coffee filter after the coffee filter has been inserted into the brewing vessel that includes a movable indicator, positionable by a user, that indicates the level of coffee to be placed within the coffee filter to produce a desired strength pot of coffee. As used herein the term brewing vessel is used to mean the vessel having an interior cavity sized to hold a disposable paper filter element and an aperture at the bottom thereof through which brewed coffee passes into the serving pot.

It is a further object of the invention to provide a coffee filter retaining insert that may be placed within the coffee filter after the coffee filter has been inserted into the brewing vessel that accomplishes all or some of the above mentioned objects in combination.

Accordingly, a coffee filter retaining insert is provided. The retaining insert includes a retaining body having a first section that slidably positionable with respect to a second section thereof to provide a variable diameter enclosure area, at least four resilient standoff arms having a first end secured to the exterior of the retaining body, a plurality of spaced, parallel oriented, coffee ground level indicators protruding from the interior wall of the retaining body, and a indicator assembly secured to the interior wall adjacent the spaced level indicators having a marking bead positionable along a rod member running perpendicular to the orientation of the level indicators The retaining body is constructed from a semi-rigid, plastic material that will retain its shape when subjected to boiling water. The top edge of the first end of the retaining body is curled to form a cylindrically shaped track member and the top edge of the second end of the retaining body is curled to form a trackway for slidably receiving the track member. With the track member riding within the trackway, the diameter of the retaining body is adjusted by positioning the track-member along the trackway until the desired diameter is achieved. The curled trackway is preferably dimensionsed and constructed of sufficiently resilient material such that the trackmember is frictionally secured in a desired position once the trackmember is positioned by the user.

The standoff arms are constructed from a resilient plastic, and have a first end secured to the exterior of the retaining body and a second end that is unconnected to the retaining body. In use the second end of the standoff arms contacts the sidewall of the filter and urges the filter against the interior wall of the brewing vessel. The first ends are preferably connected near the bottom of and spaced about the circumference of the retaining body. The second ends are preferably oriented upward from the first end and spaced outwardly from the exterior of the retaining body between about one-half (½") and one and one-half (1½") inches.

The coffee ground level indicators are preferably a plurality of spaced markings, preferably protrusions from the interior surface of the retaining body, that extend from near the bottom edge of the retaining body and extend toward the top edge of the retaining body. Although indentations into the interior surface and non-integral markers may be used, use of surface protrusions as level indicators is preferred because the retaining insert is more easily cleaned. In addition, although only one set of level indicators is required, it is preferred to include at least two sets of indicators that are spaced around the interior circumference of the retaining body. Use of more than one set of level indicators allows a user to more easily gauge the level of coffee grounds within the filter.

The indicator assembly is secured to the interior wall of the retaining body adjacent one set of level indicators. The indicator assembly may be any mechanism that allows a user to position a marker next to one of the level indicators, however, the indicator assembly preferably includes a marking bead having a central bore, and a rod member, positioned above the interior surface of the retaining body and through the bore of the marking bead. The bore is sized in relation to the rod member in a manner to allow the marking bead to remain in a user selected position. The rod member is oriented substantially perpendicularly to the level indicators.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
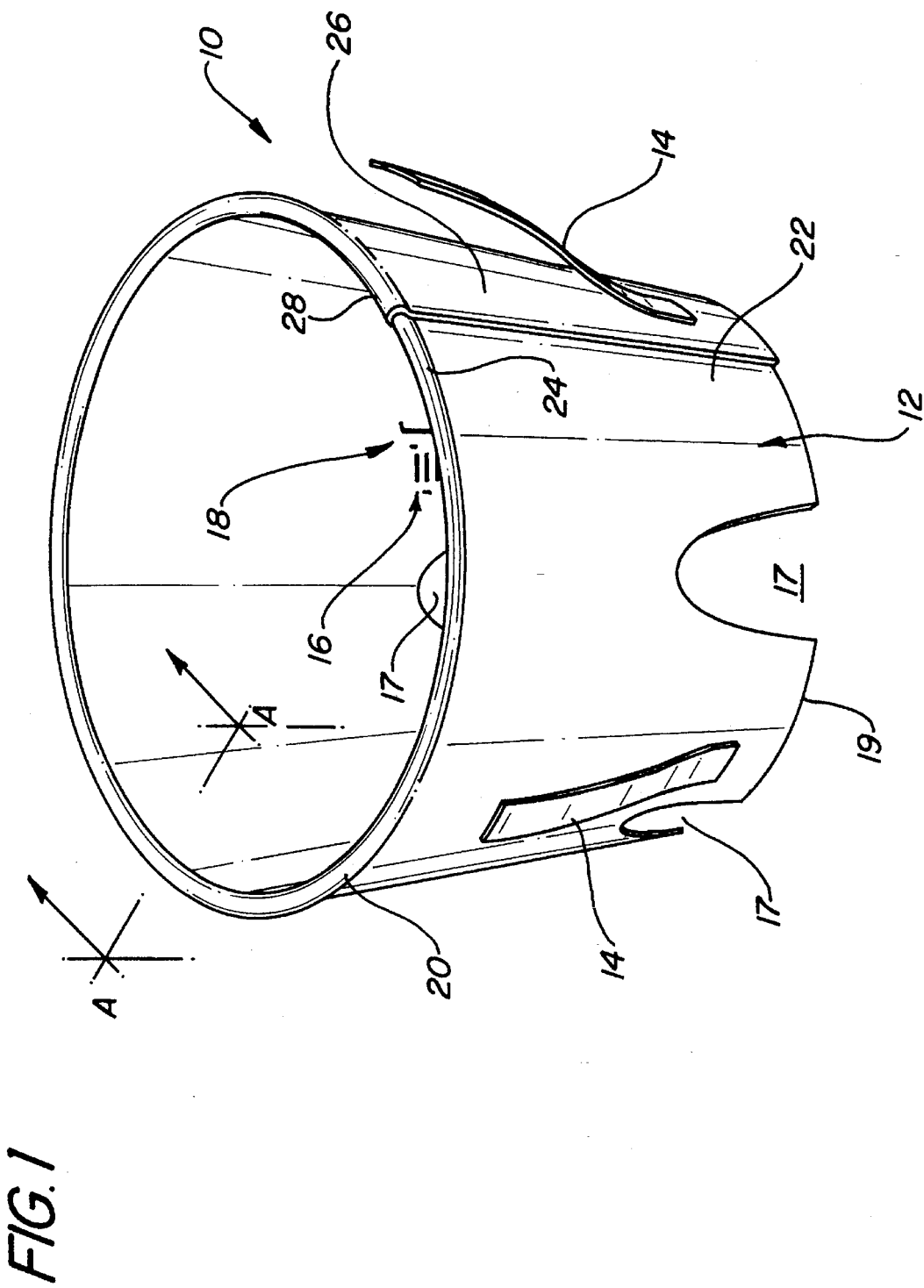
FIG. 1 is a perspective view of an exemplary embodiment of the coffee filter retaining insert of the present invention showing the retaining body wrapped in an enclosure configuration, two of the four resilient standoff arms, three of the four flow apertures along the bottom edge of the retaining body, and a portion of the indicator assembly.

FIG. 1 is a perspective view of an exemplary embodiment of the coffee filter retaining insert of the present invention generally referenced by the numeral 10. Retaining insert 10 includes a retaining body, generally referenced by the numeral 12; four resilient standoff arms 14 (two shown), four sets of spaced coffee ground level indicators 16 (a portion of one shown), and an indicator assembly (only a portion shown), generally referenced by the numeral 18.

Figure 1A:
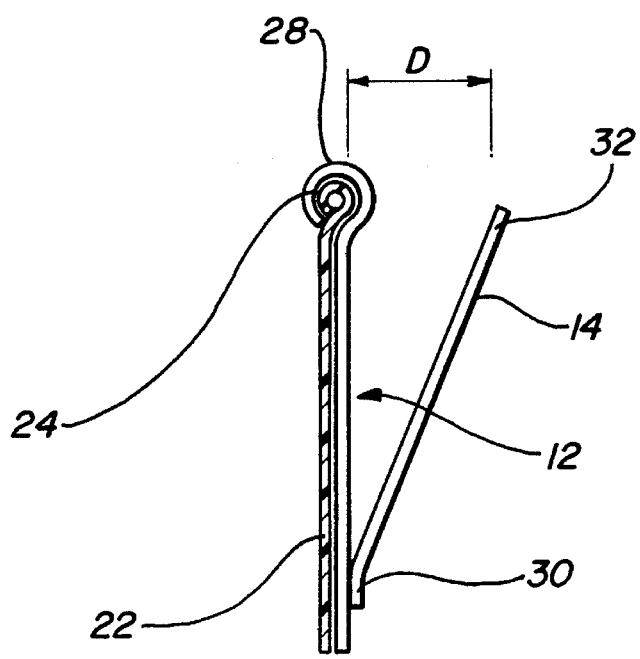
FIG. 1A is a crossectional detail view of the first end of the retaining body slidably entrapped within the second end of the retaining body, and one of the resilient standoff arms.

Retaining body 12 is constructed from a semi-rigid, plastic material that will retain its shape when subjected to boiling water. Four flow apertures 17 (only three shown) are spaced along a bottom edge 19 of retaining body member 12. A top edge 20 of a first end 22 of retaining body 12 is curled to form a cylindrically shaped track member 24. Top edge 20 of second end 26 of retaining body 12 is curled to form a trackway 28 for slidably receiving track member 24. With reference to FIG. 1A, track member 24 of first end 22 rides within trackway 28. Trackway 28 is constructed of resilient plastic and dimensioned to frictionally grip track-member 24.

Standoff arms 14 are constructed from a resilient plastic. A first end 30 of each standoff arm 14 is secured to an exterior surface of retaining body 12. A second end 32 is unconnected to retaining body 12 and is spaced a distance "D" of about three-quarters (¾") of an inch from the exterior of retaining body 12.

Figure 2A:
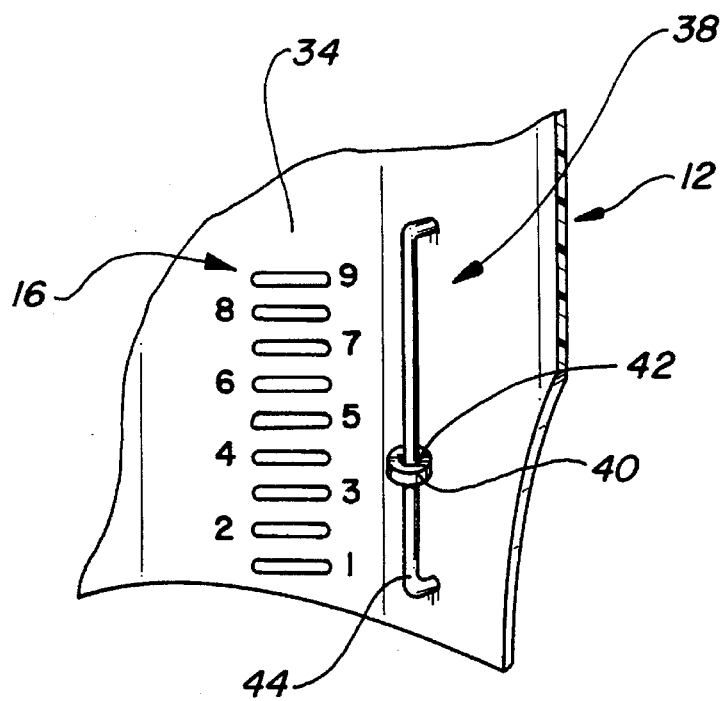
FIG. 2A is a detail view of one of the four sets of spaced level indicators and an exemplary indicator assembly including a rod member and a marking bead.
Figure 2:
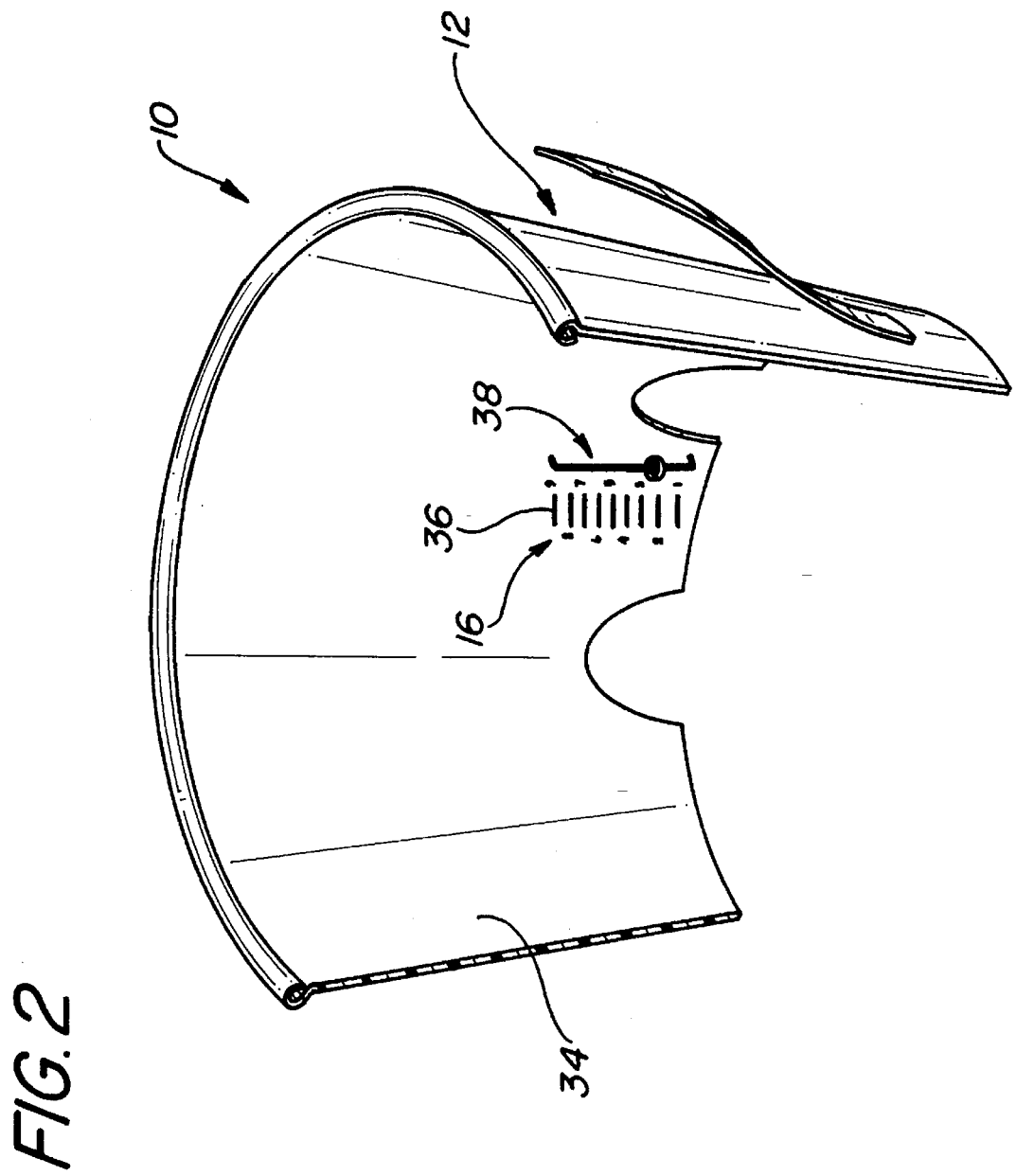
FIG. 2 is a cross-sectional, perspective view of the retaining insert of FIG. 1 along the line A—A.

FIG. 2 is a cross-sectional view of retaining insert 10 with retaining body 12 cut along the line A—A and first end 22 removed. In this embodiment, the interior surface 34 of retaining body 12 includes four sets of level indicators 16. As show shown, each set includes eight spaced protrusions 36 that are equally spaced and oriented in parallel to one another. Adjacent to one set of level indicators 16 is an indicator assembly generally indicated by the numeral 38.

FIG. 2A is an enlarged detail view of a portion of the interior surface 34 of retaining body 12 showing indicator assembly 38 secured to interior surface 34 adjacent one set of level indicators 16. As shown, indicator assembly 38 includes a marking bead 40 having a central bore 42 formed entirely therethrough and constructed from a resilient plastic, and a rod member 44, positioned above interior surface 34 and through central bore 42 of marking bead 40. The diameter of central bore 42 is about one sixty-fourth (¹⁄₆₄") of an inch smaller than the diameter of rod member 44. The sidewalls of central bore 42 resiliently grip and hold marking bead 40 in the position where it is left after being positioned by a user.

Figure 3:
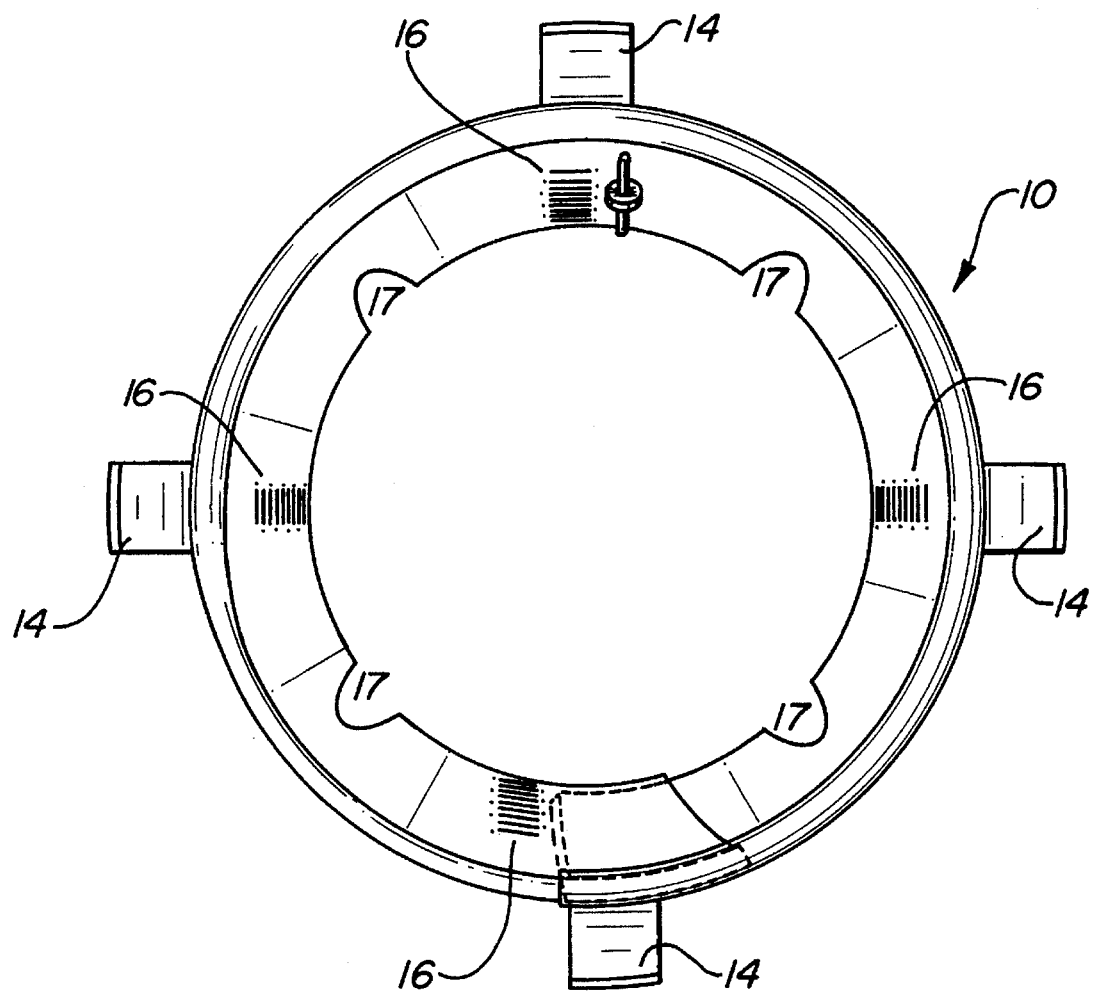
FIG. 3 is a top view of the retaining insert of FIG. 1 showing all four flow apertures, the four sets of spaced level indicators, and the marking bead slidably positionable along the rod member of the indicator assembly.

FIG. 3 is a top view of retaining insert 10 showing all four sets of level indicators 16, all four standoff arms 14, and all four flow apertures 17.

Use of retaining insert 10 is now described with general reference to FIGS. 1–3. A pot of coffee is brewed by placing a disposable paper filter of the type previously discussed within the brewing vessel of a drip-type coffee maker. Retaining insert 10 is then inserted in a manner such that bottom edge 19 of retaining body 12 contacts the interior bottom of the disposable paper filter and the second ends 33 of standoff arms 14 contact and urge sections of the filter sidewall against the interior sidewalls of the interior cavity the brewing vessel. The diameter of retaining insert 10 can be altered if required to accomplish the above positioning by sliding first section 22 with respect to second section 26 until a desired diameter is achieved. Once the desired diameter has been selected, retaining body 12 is held at the selected diameter by frictional forces between the walls of trackway 28 and track-member 24.

After retaining insert is inserted within the paper coffee filter, coffee grounds are added into the paper filter and the brewing vessel agitated sufficiently to spread the coffee grounds throughout the bottom of the filter utilizing pathways created by flow apertures 17 and to achieve a level coffee ground surface within the filter. The ground level is then compared to the ground level indicators 16. When the desired coffee ground level is reached, as indicated by level indicators 16, brewing of the coffee may begin as usual.

When first utilizing retaining insert 10 with a particular coffee maker, experimentation is required to determine the level of coffee grounds required to produce a pot of coffee of the strength desired. Once the ground level is determined for a desired strength, marking bead 40 can be moved adjacent to the required level. This allows guests, and others not accustomed to the particular coffee maker, to confidently brew a pot of coffee at the strength desired by those sharing the particular coffee maker.

It can be seen from the preceding description that a coffee filter retaining insert that can be placed within the coffee filter after the coffee filter has been inserted into the brewing vessel that will support the sidewalls of the filter and assist in preventing the sidewall of the filter from collapsing during the coffee brewing process has been provided. It can also be seen that a coffee filter retaining insert that may be placed within the coffee filter that includes a mechanism that contacts the sidewall of the filter and urges it against the sidewall of the brewing vessel, and that includes a movable indicator, positionable by a user, that indicates the level of coffee to be placed within the coffee filter to produce a desired strength pot of coffee has also been provided.

It is noted that the embodiment of the coffee filter retaining insert described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A coffee filter retaining insert comprising:

a retaining body having a first section slidably positionable with respect to a second section thereof to provide a variable diameter enclosure area;

at least four resilient standoff arms having a first end secured to an exterior surface of said retaining body;

a plurality of spaced, parallel oriented, coffee ground level indicators disposed on an interior wall of said retaining body, and an indicator assembly secured to said interior wall adjacent said spaced level indicators having a marking device positionable by a user to indicate a desired coffee ground level indicator.

2. The coffee filter retaining insert of claim 1, wherein:

said indicator assembly includes a marking bead positionable along a rod member running perpendicular to said orientation of said level indicators.

3. The coffee filter retaining insert of claim 1, wherein:

said indicator assembly includes a marking bead having a central bore and a rod member positioned above said interior surface of said retaining body and through said bore of said marking bead.

4. The coffee filter retaining insert of claim 3 wherein:

said bore is sized in relation to said rod member in a manner to allow said marking bead to remain in a user selected position.

5. The coffee filter retaining insert of claim 1 wherein:

a first top edge of said first section of said retaining body is curled to form a cylindrically shaped track member; and a second top edge of said second section of said retaining body is curled to form a trackway for slidably receiving said track member.

6. The coffee filter retaining insert of claim 5 wherein:

said trackway has a diameter dimensionsed such that said trackmember is frictionally gripped by said trackway.

7. The coffee filter retaining insert of claim 1 wherein:

said standoff arms are constructed from a resilient plastic, and each said standoff arm includes a first end secured to an exterior surface of said retaining body and a second end moveable with respect to said retaining body.

8. The coffee filter retaining insert of claim 1, wherein:

four flow apertures are spaced along a bottom edge of said retaining body.

9. The coffee filter retaining insert of claim 1, further including:

a second plurality of spaced, parallel oriented, coffee ground level indicators disposed on an interior wall of said retaining body.

10. The coffee filter retaining insert of claim 3 wherein:

a first top edge of said first section of said retaining body is curled to form a cylindrically shaped track member; and a second top edge of said second section of said retaining body is curled to form a trackway for slidably receiving said track member.

11. The coffee filter retaining insert of claim 10 wherein:

said trackway has a diameter dimensionsed such that said trackmember is frictionally gripped by said trackway.

12. The coffee filter retaining insert of claim 10, wherein:

four flow apertures are spaced along a bottom edge of said retaining body.

13. The coffee filter retaining insert of claim 10, further including:

a second plurality of spaced, parallel oriented, coffee ground level indicators disposed on an interior wall of said retaining body.

14. The coffee filter retaining insert of claim 8, further including:

a second plurality of spaced, parallel oriented, coffee ground level indicators disposed on an interior wall of said retaining body.

15. The coffee filter retaining insert of claim 8 wherein:

said standoff arms are constructed from a resilient plastic, and each said standoff arm includes a first end secured to an exterior surface of said retaining body and a second end moveable with respect to said retaining body.

16. The coffee filter retaining insert of claim 3, wherein:

four flow apertures are spaced along a bottom edge of said retaining body.

17. The coffee filter retaining insert of claim 4 wherein:

a first top edge of said first section of said retaining body is curled to form a cylindrically shaped track member; and a second top edge of said second section of said retaining body is curled to form a trackway for slidably receiving said track member.

18. The coffee filter retaining insert of claim 17 wherein:

said trackway has a diameter dimensionsed such that said trackmember is frictionally gripped by said trackway.

19. The coffee filter retaining insert of claim 18, wherein:

four flow apertures are spaced along a bottom edge of said retaining body.

20. The coffee filter retaining insert of claim 1 wherein:

said standoff arms are constructed from a resilient plastic, and each said standoff arm includes a first end secured to an exterior surface of said retaining body and a second end moveable with respect to said retaining body.

* * * * *